(12) United States Patent
Van Berkel et al.

(10) Patent No.: US 7,436,594 B2
(45) Date of Patent: Oct. 14, 2008

(54) AUTOSTEREOSCOPIC DISPLAY APPARATUS

(75) Inventors: Cornelis Van Berkel, Hove (GB); Alan G. Knapp, Crawley (GB); Hugo J. Cornelissen, Waalre (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 265 days.

(21) Appl. No.: 10/566,787

(22) PCT Filed: Jul. 22, 2004

(86) PCT No.: PCT/IB2004/002400

§ 371 (c)(1),
(2), (4) Date: Jan. 31, 2006

(87) PCT Pub. No.: WO2005/011291

PCT Pub. Date: Feb. 3, 2005

(65) Prior Publication Data

US 2006/0203336 A1 Sep. 14, 2006

(30) Foreign Application Priority Data

Jul. 29, 2003 (GB) .................................. 0317714.4

(51) Int. Cl.
*G02B 27/22* (2006.01)
(52) U.S. Cl. ........................... 359/462; 359/463; 348/59
(58) Field of Classification Search .................. None
See application file for complete search history.

(56) References Cited

U.S. PATENT DOCUMENTS 6,064,424 A    5/2000  van Berkel et al.
6,069,650 A  *  5/2000  Battersby .................... 348/59
2003/0011884 A1    1/2003  Van Berkel

FOREIGN PATENT DOCUMENTS

GB    2 196 166           4/1998
JP    06265891 A  *       9/1994

OTHER PUBLICATIONS

Jaap H. M. Neijzen et al. :"Multiple Scattering of Light From Polymer Dispersed Liquid Crystal Material"; Philips Research Laboratories, Professor Holstlaan 4; 5656 AA Eindhoven; The Netherlands; Liquid Crystals, 1997; vol. 22, No. 3, pp. 255-264.

* cited by examiner

*Primary Examiner*—Lee Fineman (57) ABSTRACT

An autostereoscopic display device (1), includes a display panel (10), a lenticular sheet (15) and an electrically controllable diffuser (80). The electrically controllable diffuser (80) includes an optical medium (94), e.g. polyethyleneterephthalate (PET), with a structured surface (98) against an electro-optic medium (95), e.g. a small droplet polymer dispersed liquid crystal (PDLC) layer. The electro-optic material (95) refractive index is varied with an applied electric field (or zero field) and is switchable between at least (i) a value (n2) substantially matching that of the optical medium (94), which provides a substantially non-diffusing mode, hence 3D operation of the display device, and (ii) a value (n1) different to that of the optical medium (94) hence causing refraction at the structured surface (98), the structured surface (98) providing different refraction angles ($\theta_0$) so as to provide an overall diffusing effect, hence 2D operation. The diffuser (80) may be provided as a stand-alone item.

11 Claims, 6 Drawing Sheets

AUTOSTEREOSCOPIC DISPLAY APPARATUS

The present invention relates to autostereoscopic display apparatus, including colour autostereoscopic display apparatus, in particular autostereoscopic display apparatus electrically switchable between an autostereoscopic display mode and a two-dimensional display mode. The present invention also relates to electrically controllable or switchable diffusers which are electrically controllable or switchable between a diffusing mode and a non-diffusing mode.

Stereoscopic displays are able to provide an image that is made up of different sub-images at different viewing points. If suitably adjusted different sub-images (i.e. with appropriate binocular disparity) are provided to the left eye and the right eye of a viewer, the overall image is perceived by the viewer as a three dimensional image. One known method to provide differing images is by varying the colour content, with the viewer needing to wear special spectacles with a different colour-absorbing lens in each eyepiece.

Stereoscopic displays that provide an image made up of different sub-images at different viewing points without the viewer needing to wear special spectacles are known as autostereoscopic displays. A typical autostereoscopic display comprises a matrix liquid crystal display (LCD) panel comprising an array of display elements arranged in rows and columns. The display further comprises means for directing output light from the array of display elements such that the visual output provided from a given point on the display panel is dependent upon the viewing angle. This means that the right eye of a viewer will see a different view to that seen by the left eye, providing the desired stereoscopic or three-dimensional image.

A well known form of the output light directing means is a lenticular sheet overlying the display panel. A lenticular sheet, for example in the form of a moulded or machined sheet of polymer material, overlies the output side of the display panel with its lenticular elements, comprising (semi) cylindrical lens elements, extending in the column direction with each lenticular element being associated with a respective group of two, or more, adjacent columns of display elements and extending parallel with the display element columns. In an arrangement in which each lenticule is associated with two columns of display elements, the display panel is driven to display a composite image comprising two 2-D sub-images vertically interleaved, with alternate columns of display elements displaying the two images, and the display elements in each column providing a vertical slice of the respective 2-D sub-image. The lenticular sheet directs these two slices, and corresponding slices from the display element columns associated with the other lenticules, to the left and right eyes respectively of a viewer in front of the sheet so that, with the sub-images having appropriate binocular disparity, the viewer perceives a single stereoscopic image. In other, multi-view, arrangements, in which each lenticule is associated with a group of more than two adjacent display elements in the row direction and corresponding columns of display elements in each group are arranged appropriately to provide a vertical slice from a respective 2-D (sub-) image, then as a viewer's head moves a series of successive, different, stereoscopic views are perceived for creating, for example, a look-around impression. In view of the need for the lenticular elements to be accurately aligned with the display pixels, it is customary for the lenticular screen to be mounted over the display panel in a permanent manner so that the position of the lenticular elements is fixed in relation to the array of pixels.

Autostereoscopic display apparatus of this kind can be used for various applications, for example in medical imaging, virtual reality, games, mobile telephone and CAD fields.

US-A1-2003/0011884 discloses an autostereoscopic display apparatus provided with an electrically switchable light diffusing layer comprising electro-optic material, e.g. a Polymer Dispersed Liquid Crystal (PDLC) layer, sandwiched between opposing electrodes. By applying appropriate potential differences to the electrodes the layer can be changed from a non-scattering state to a strongly diffusing state such that the apparatus changes from a 3-D mode to a 2-D mode, due to the diffusing state cancelling out the optical effect of the lenticular sheet.

The present inventors have realised that the scattering or diffusion characteristics of conventional electrically switchable light diffusing layers, such as the PDLC layer used in the apparatus disclosed by US-A1-2003/0011884, are not optimum for the specific diffusion role they play in such devices. In particular, the present inventors have realised that the angular scattering characteristics of known diffuser layers are not optimally suited for the process of diffusing the light across the lenticular sheet so as provide a high level of mixing of the light from pixels or sub-pixels associated with a given lenticule whilst nevertheless keeping light from pixels or sub-pixels associated with different lenticules apart as much as possible.

In a first aspect, the present invention provides an electrically controllable or switchable light diffuser, comprising: an optical medium or substrate and an electro-optic medium or layer; transparent electrodes arranged for providing an electric field across the electro-optic medium so as to allow control of the refractive index of the electro-optic medium by application or non-application of an electric field across the electro-optic medium or by variation of an electric field across the electro-optic medium; the optical medium and the electro-optic medium being arranged with an effective optical interface between a first surface of the optical medium and a first surface of the electro-optic medium, the effective optical interface being formed for example by the electro-optic medium and optical medium directly abutting, or for example with another layer, for example a transparent electrode, therebetween; wherein at least one of the first surface of the optical medium and the first surface of the electro-optic medium is structured with a surface profile, the surface profile comprising plural surface angles or facet angles, or a distribution of surface angles or facet angles or contours providing variable angles or plural angles, such that (i) when the refractive index of the electro-optic medium is controlled by application or non-application of an electric field to be substantially equal to the refractive index of the optical medium there is substantially no refraction arising from the effective optical interface between the first surface of the optical medium and the first surface of the electro-optic medium, and such that (ii) when the refractive index of the electro-optic medium is controlled by application or non-application of an electric field to be different from the refractive index of the optical medium, refraction does take place at the effective optical interface between the first surface of the optical medium and the first surface of the electro-optic medium, and, by virtue of the surface profile, for example there being plural surface angles or facet angles, or for example the surface profile comprising a distribution of surface angles or facet angles or contours providing variable angles or plural angles, the refraction directs light to a corresponding plurality of angles or directions thereby providing a diffusion effect or mode.

Preferably, the plural surface angles are distributed differently in different surface directions such that light is diffused to different extents in different surface directions.

Preferably, the electro-optic medium comprises small droplet polymer dispersed liquid crystal.

In a further aspect, the present invention provides an autostereoscopic display device comprising an electrically controlled diffuser according to the above described first aspect or any of the above described variations of the first aspect.

Preferably, the autostereoscopic display comprises a display panel, for example a liquid crystal display panel, and directing means, for example a lenticular sheet. The electrically controllable diffuser is arranged so as to provide a diffusion effect so as to disrupt the effect of the directing means in at least one electric field mode, the electric field mode comprising application of a given magnitude of electric field or voltage across the electro-optic medium, or non-application of an electric field or voltage across the electro-optic medium.

Preferably, in another different one of the above described electric field modes, substantially no diffusion takes place. Another possibility is for an intermediate diffusion effect to take place, providing for example an image intermediate between 2D and 3D.

Preferably, during the diffusion effect, the extent of diffusion is sufficient to provide sufficient mixing to provide a substantially 2D image.

Preferably the display panel comprises sub-pixels or pixels are arrayed in rows and columns; the directing means comprises lenticular elements arranged substantially parallel with the columns, such that groups of the sub-pixels or pixels along a row are arranged in correspondence with respective lo lenticular elements; and the plural surface angles are distributed differently in the row and column directions such that in the diffusing mode light is diffused more in the row direction than in the column direction.

Preferably the distribution or variation of surface angle is made such that this varies on a scale larger than the diffraction limit, but smaller than the sub-pixel spacing, hence the effect observed is one of a diffuser with respect to the spacing of the sub-pixels.

In a further aspect the present invention provides an autostereoscopic display device, comprising a display panel, a directing means, e.g. a lenticular sheet, and an electrically controllable diffuser. The electrically controllable diffuser comprises an optical medium, e.g. polyethyleneterephthalate (PET), with a structured surface against an electro-optic medium, e.g. a small droplet polymer dispersed liquid crystal (PDLC) layer. The electro-optic material refractive index is varied with an applied electric field (or zero field) and is switchable between at least (i) a value substantially matching that of the optical medium, which provides a substantially non-diffusing mode, hence 3D operation of the display device, and (ii) a value different to that of the optical medium hence causing refraction at the structured surface, the structured surface providing different refraction angles so as to provide an overall diffusing effect, hence 2D operation. The diffuser may be provided as a stand-alone item.

In the present invention, diffusion, or an effective diffusion effect, is provided by the variation in different angular outputs from the roughened surface between the optical medium and the electro-optic medium. This angular variation may be controlled or predetermined by varying the surface profile of the structured surface, and/or by varying the refractive indices of the optical medium and/or the electro-optic medium and by varying or selecting the level of voltage or electric field applied across the electro-optic medium. This allows the angular distribution of the diffused light to be controlled, selected or predetermined accordingly, at least approximately, to distributions more suitable than those available from conventional electrically controlled diffusers which rely on bulk diffusion through the bulk of an electro-optic or otherwise switchable layer.

Embodiments of the present invention will now be described, by way of example, with reference to the accompanying drawings, in which.

Figure 1:
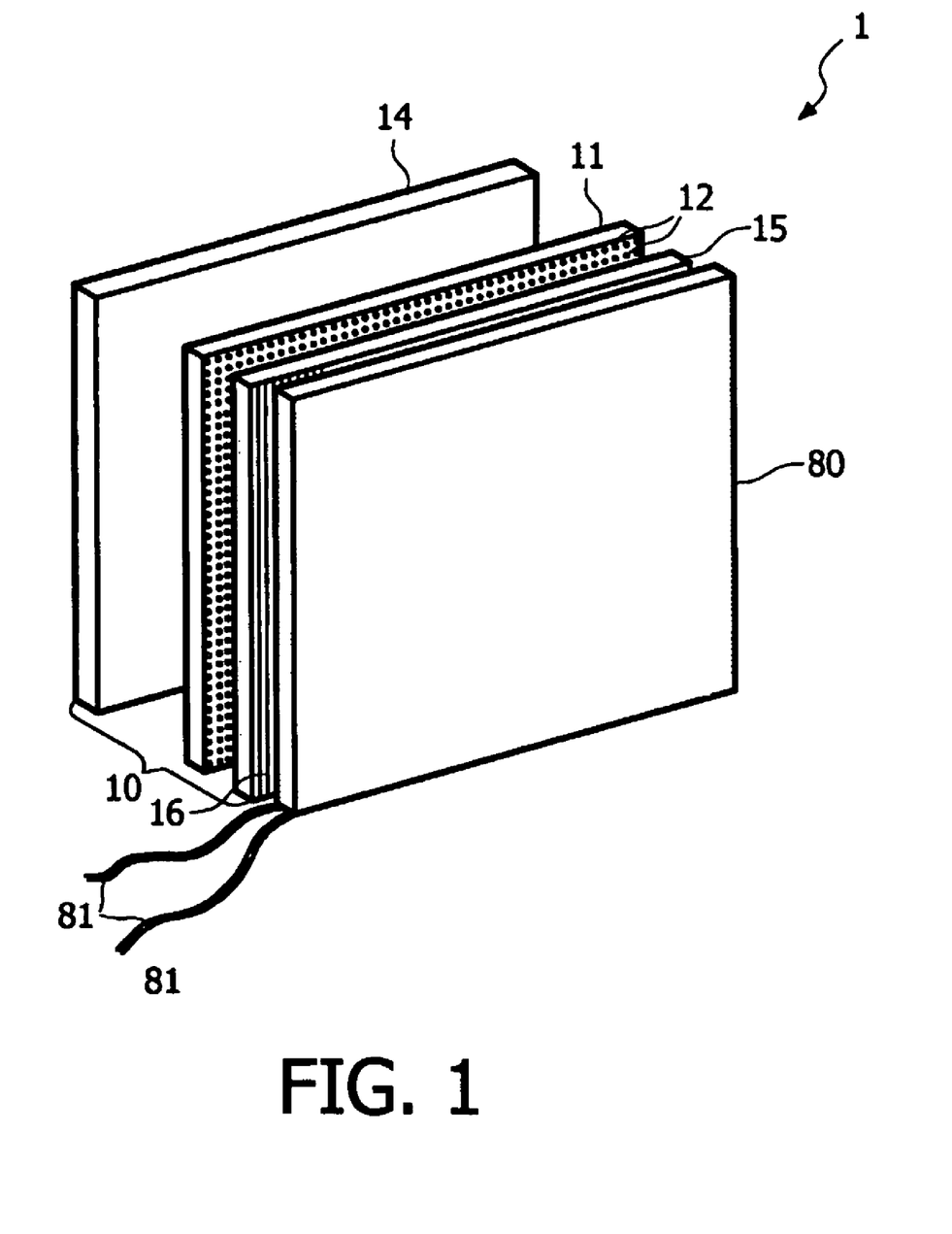
FIG. 1 is a schematic perspective view of a colour display apparatus comprising an autostereoscopic display means and an electrically switchable light diffuser.

FIG. 1 is a schematic perspective view of a colour display apparatus 1 comprising an autostereoscopic display means 10 and an electrically switchable light diffuser 80.

The autostereoscopic display 10 comprises a conventional active colour matrix liquid crystal display (AMLCD) panel 11 used as a spatial light modulator and having a planar array of display elements 12 arranged in aligned rows and columns perpendicular to one another. The display elements are shown schematically with only a comparatively few in each row and column for simplicity. The display panel 11 is illuminated by a light source 14 which can be of any suitable kind and in this example comprises a planar back-light co-extensive with the area of the display element array. Light incident on the panel is modulated by the individual display elements, or sub-pixels, 12 by the application of appropriate drive voltages thereto so as to produce the desired image display output.

Overlying the output side of the display panel 11, there is disposed a lenticular sheet 15 providing an array of elongate, parallel, lenticular elements 16. The lenticular elements 16 comprise optically cylindrically converging lenticules, for example formed as convex cylindrical lenses which extend parallel to the columns of display elements and serve in a known manner to provide separate images, which are generated in the array of the display panel 11 in a vertically interleaved fashion, to the two eyes of a viewer facing the side of the lenticular sheet 15 remote from the display panel 11 so that a stereoscopic, or 3-D, image can be perceived. Autostereoscopic display apparatus using lenticular sheets in conjunction with matrix display panels are well known and it is not thought necessary to describe here in detail their operation. Examples of such apparatus and their operation are described or referenced in the aforementioned US-A1-2003/0011884 and in GB-A-2196166, both of whose contents are incorporated herein by reference. Each lenticular element 16 may overlie a respective group of two, three, or more, adjacent columns of sub-pixels, to provide a corresponding number of views.

Each lenticular element provides a spatially discrete output beam from each of the associated pixel columns in mutually different, angular directions. The display panel is driven so that a narrow vertical slice of a 2-D (sub) image is produced by each column of sub-pixels with the display produced comprising a plurality of interleaved 2-D (sub) images which are to be seen by the left and right eye respectively of a viewer. Each lenticular element 16 thus provides a plurality of output beams, one from each of its associated columns of sub-pixels, whose optical axes are in mutually different directions and angularly spread around the longitudinal axis of the lenticular element. With appropriate 2-D image information applied to respective columns of display elements then to a viewer whose eyes receive different ones of the beams a 3-D image is perceived. With each lenticular element being associated with a plurality of several sub-pixel columns then different stereoscopic images can be viewed as the viewer's head moves in the row direction. Although the lenticular elements are usually substantially aligned with the sub-pixel columns, they could instead be slanted slightly with respect to the columns as described in U.S. Pat. No. 6,064,424.

Figure 2:
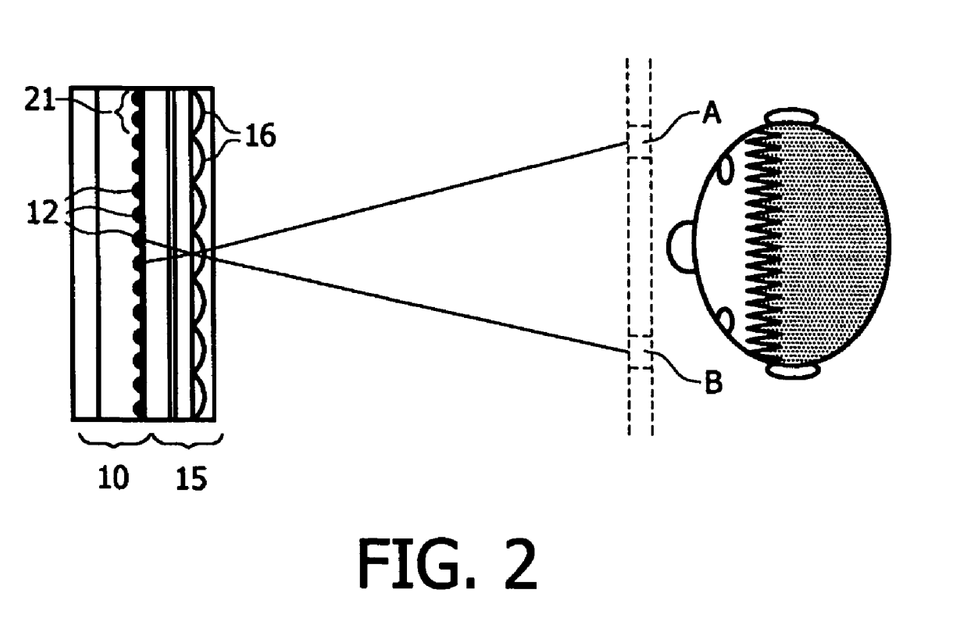
FIG. 2 illustrates, in plan view, operation of the apparatus of FIG. 1 in producing a two view display output.

FIG. 2 illustrates, in plan view, the operation of the apparatus in producing, in this example, a two view display output, in which each lenticular element 16 overlies a respective group 21, a pair in this example, of adjacent sub-pixel columns such that two vertical strips, each representing a vertical slice of a respective 2-D view, are presented to the viewer. With appropriate 2-D image information applied to the sub-pixels 12, and with the viewer's eyes being at a suitable distance to receive different ones of the output beams, a 3-D image is perceived. The number of views can be varied from just having the two views, shown in FIG. 2, giving a single stereoscopic image to more views, for example seven views providing six stereoscopic images. (For the sake of clarity, the electrically switchable light diffuser 80 is not shown in FIG. 2.)

Figure 3:
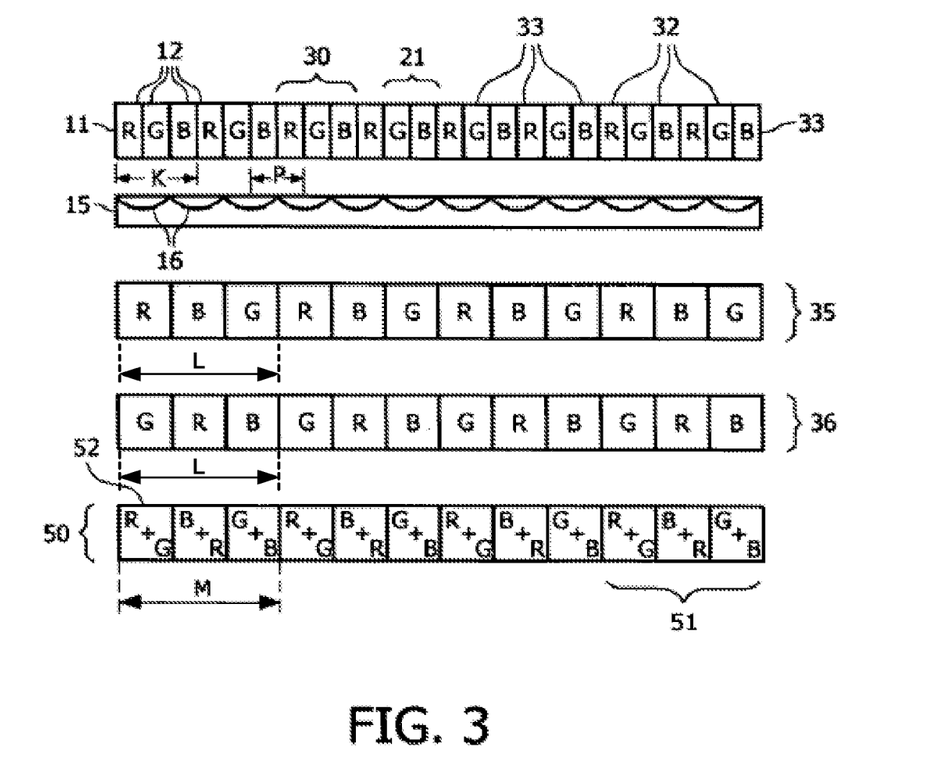
FIG. 3 is a schematic plan view of part of a row of display elements in the apparatus of FIG. 1.

FIG. 3 is a schematic plan view of part of a row of display elements in the colour matrix LCD panel 11. The panel 11 comprises a colour pixel layout in which each colour pixel 30 comprises three (red, R, green, G, and blue, B) adjacent sub-pixels 12 in a row constituting a horizontal RGB triplet 30. Such a colour pixel layout is formed using vertical colour filter strips with the display elements 12 of the display panel 11 being arranged in respective, R, G and B, columns in repeating fashion. The pixel pitch of such a display panel is a measure of the spacing of the pixels in the panel. Commonly, for a conventional colour matrix LCD panel, the pixel pitch is substantially equal in the vertical, column, and horizontal, row, directions. FIG. 3 shows eight RGB colour pixels 30 each comprising three sub-pixels 12. The horizontal pitch K is equal to the width of the pixel plus the spacing between adjacent pixels (not shown). The resolution of such a display panel 11 is a measure of the spatial frequency at which the pixels are perceived by a viewer. A high resolution is, of course, desirable as this produces a high quality image output. Commonly, for a conventional colour matrix LCD panel, the resolution is substantially equal in the vertical, column, and horizontal, row directions.

The lenticular sheet 15 overlies the display panel 11 with each elongate lenticular element 16 substantially covering a respective pair 21 of adjacent sub-pixel columns. The pitch, p, of the lenticular lens is the distance between the respective centres of two adjacent elongate lenticular elements 16. It will be appreciated that only one row of the display panel 11 is shown and therefore only one pair of sub-pixels 21 adjacent in the horizontal direction are shown to correspond with each lenticular element 16. It will also be appreciated that the lenticular array 15 is depicted schematically and so a cross-section of part of one row is shown. The individual lenticules 15 direct the output light from the corresponding sub-pixels 32, 33 in mutually different directions. Referring also to FIG. 2, a viewer will perceive a two-view stereoscopic image. The output from each sub-pixel on the left 32 of each pair 21 is directed to region A and therefore is viewed by the right eye of the viewer in FIG. 2. The perceived horizontal pixel pitch L of the image seen at A, 35, is twice the length of the panel horizontal pixel pitch K. Likewise, the output from each sub-pixel on the right 33 of each pair 21 is directed to region B and therefore is viewed by the left eye of the viewer in FIG. 2. The image seen at B, 36, is perceived to have horizontal pixel pitch L. Therefore the horizontal resolution of the two-view stereoscopic image is half of that of the corresponding 2-D image as viewed without the lenticular sheet 15.

Although the example above describes the case for a two-view system, there is also a reduction in resolution with a stereoscopic image having more than two-views. For example, each lenticule may substantially cover four adjacent sub-pixel columns giving a four-view stereoscopic display having a horizontal resolution of one quarter of the corresponding 2-D display.

Referring again to FIG. 1, the role of the electrically switchable light diffuser 80 will now be described in more detail. In a first condition the electrically switchable light diffuser 80 is switched to a substantially non-diffusing, i.e. substantially clear, state, such that a viewer perceives a stereoscopic, 3-D, image as described above and resulting in images 35 and 36. In a second condition the electrically switchable light diffuser 80 is switched to a substantially diffusing state such that the directional effects of the lenticular sheet 15 are substantially negated and consequently a viewer perceives a 2-D image. The electrically switchable light diffuser 80 is arranged in close proximity with, preferably directly contacting, the surface of the sheet 15.

The effect, when the electrically switchable light diffuser 80 is in the above described second condition, i.e. switched to a substantially diffusing state, is illustrated schematically in FIG. 3. An averaging effect occurs such that the light outputs from each sub-pixel in each pair 21 are directed in substantially the same directions. Therefore both eyes of a viewer see the same image 50. The output from each perceived pixel corresponding to an individual lenticular element 16 is contributed to by all of the sub-elements within the corresponding, underlying sub-pixel pair 21. For example, where, with the electrically switchable light diffuser 80 switched to a clear state, the right eye views the output from a red sub-pixel and the left eye views the output from an adjacent green sub-pixel, both eyes now, with the electrically switchable light diffuser 80 switched to the diffusing state, view a mix of the outputs from both the red and green sub-pixels. Therefore a viewer sees an image 50 in which both eyes receive light outputs from all sub-pixels and so a 2-D image is perceived. In this example, a mixed triplet 51 is contributed to by outputs of six display elements, two of each colour. The pitch M of the mixed triplet 51 is the same as the stereoscopic perceived horizontal pitch L.

However, the overall output of each mixed triplet 51 comprises the outputs of two colour "unmixed" pixel triplets. Therefore the 2-D perceived horizontal pixel pitch is half of the mixed triplet pitch M. The resolution of the 2-D image is thus greater than the resolution of the stereoscopic image. For a two view display as described in the above example, the full resolution is recovered by switching the electrically switchable light diffuser 80 in this manner.

The role and effect of the electrically switchable light diffuser 80 when switched to the substantially diffusing state as described above, represents an lo idealised or optimum outcome that would be achieved with an ideal electrically switchable light diffuser 80. In particular, the above account assumes that the angular diffusion properties of the light diffusing layer are idealised such that, firstly, light from the two sub-pixels corresponding to a particular lenticular element are fully and equally mixed (e.g. "R+G" as in a combined sub-pixel is image 52 of image 50), and secondly, none of the light from the two sub-pixels corresponding to a particular lenticular element is scattered any wider such as to arrive in the light paths of adjacent sub-pixels along the row (e.g. such that no blue B is present in the "R+G" combined sub-pixel image 52 of image 50) or from adjacent sub-pixels along the same column (i.e. further down the particular lenticular element).

Reasonable performance may be achieved using a conventional electrically switchable light diffusing layer, such as the bulk PDLC layer described in the aforementioned US-A1-2003/0011884. Nevertheless, such conventional diffuser layers do not have particularly suitable angular diffusion properties for the purposes described above.

Figure 4A:
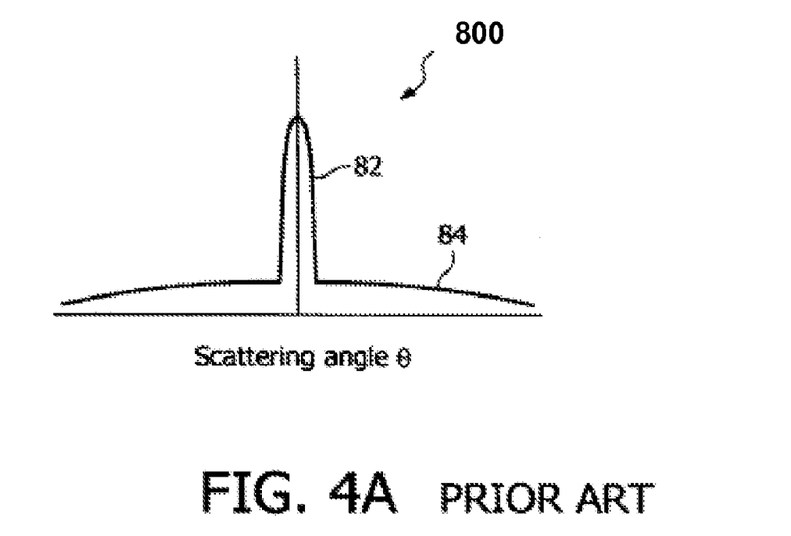
FIG. 4A shows a (not to scale) typical angular diffusion (scattering) profile of a conventional PDLC layer used as a bulk diffuser in the prior art.

FIG. 4A shows a (not to scale) typical angular diffusion (this may also be considered as scattering) profile 800 of a conventional bulk PDLC layer. The conventional angular diffusion profile 800 contains a strong "ballistic" peak 82 of light travelling through the PDLC layer unimpeded, and a broad multiple scattering shoulder 84. Neither feature is desirable. The strong ballistic peak 82 reduces the extent to which the light from two sub-pixels corresponding to a particular lenticular element fully and equally mixes. The broad multiple scattering shoulder 84 increases the extent to which the light from the two sub-pixels corresponding to a particular lenticular element is scattered wider such as to arrive in the light paths of other sub-pixels.

Figure 4B:
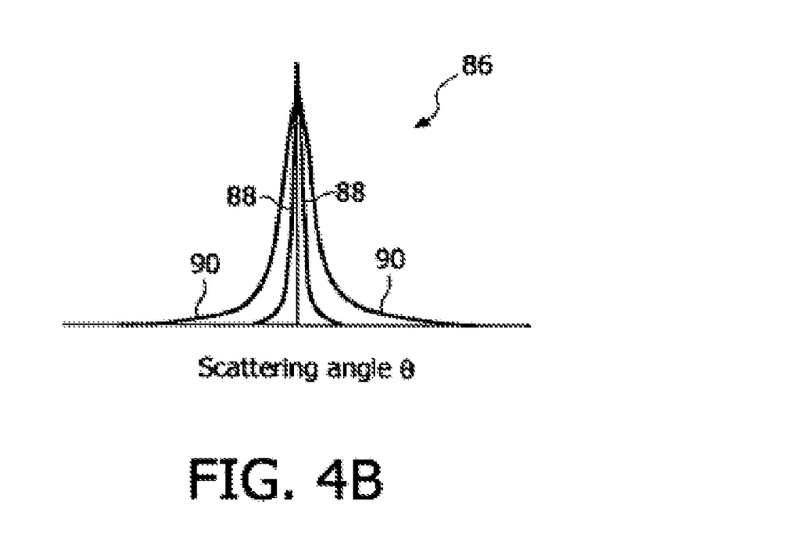
FIG. 4B shows an idealised angular diffusion (scattering) profile.

The present inventors have further realised that a more suitable angular diffusion (scattering) profile is an angular diffusion profile 86 shown (not to scale) in FIG. 4B. The present inventors have realised that ideally the electrically switchable light diffuser would induce no vertical scattering, and would have a Gaussian diffusion over a narrow angle in the horizontal direction. The scattering angle is ideally just enough to mix the light from sub-pixels belonging to the same group of sub-pixels underneath or corresponding to a given lens, i.e. the scattering angle is ideally of the order of the width of the viewing zones, which is given by $$\phi = 2\tan^{-1}\frac{p}{2f}$$

where p is the lens pitch and f the focal distance. Typical values for current displays for p and f are p=0.4 mm and f=1.5 mm, giving a scattering angle of 15° degrees (FWHM). In future it is expected that larger φ will become desirable. Scattering over angles larger than φ will tend to reduce brightness (light is lost into large angles) and contrast (the scattering mixes light from pixels underneath different lenticular elements). Referring to FIG. 4B, the angular diffusion profile 86 comprises a vertical scattering component 88 of less than 1%, and a horizontal scattering component 90 of approximately 10%.

Figure 5:
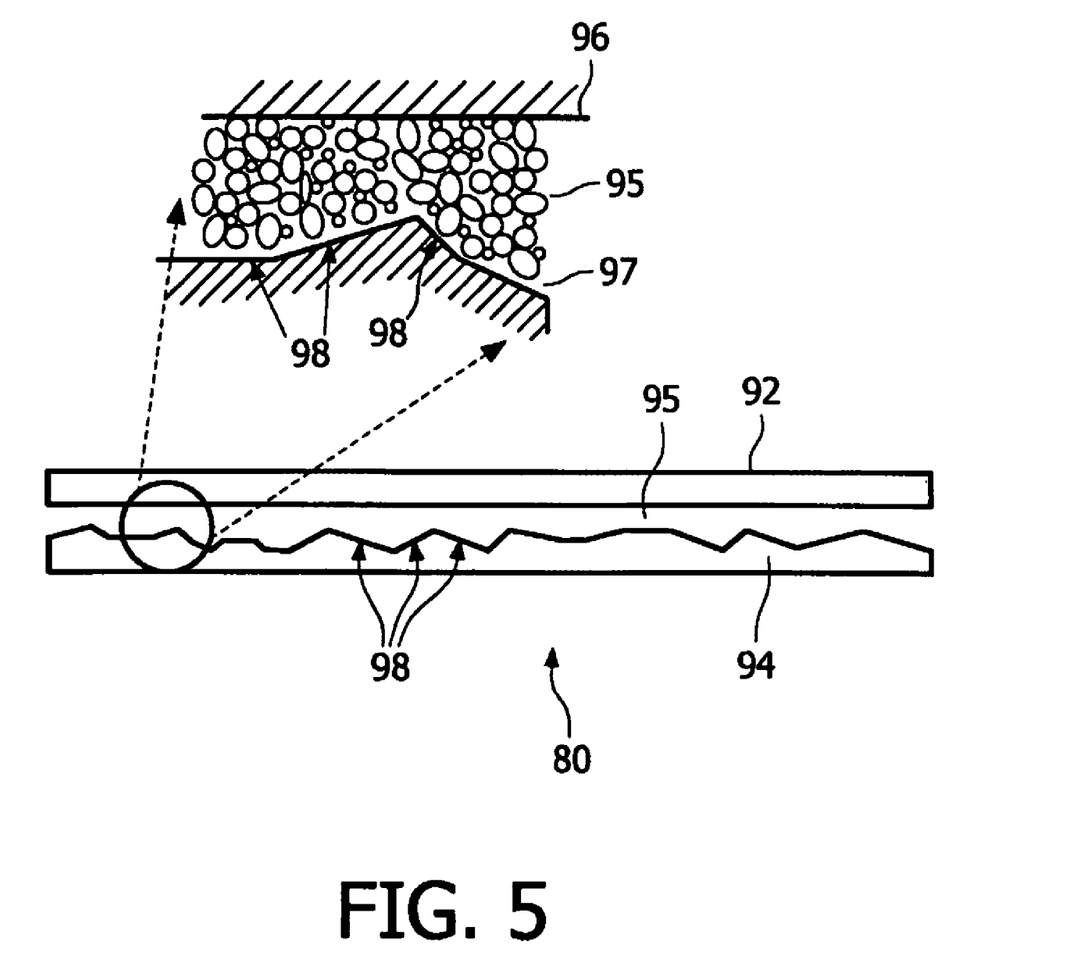
FIG. 5 shows details of an electrically switchable light diffuser provided in the apparatus of FIG. 1.

FIG. 5 shows further details of the electrically switchable light diffuser 80 provided in this embodiment.

The electrically switchable light diffuser 80 comprises two spaced apart transparent substrates 92, 94, for example thin plastic substrates made of polyethyleneterephthalate (PET), thereby forming a cell in which a small droplet PDLC material 95 is sandwiched. Transparent electrodes 96, 97, made for example of indium tin oxide, are provided on the inner surfaces of the substrates 92, 94, i.e. in opposed arrangement. The leads 81 (as shown in FIG. 1) are coupled to the transparent electrodes 96, 97. In operation the leads 81 and transparent electrodes 96, 97 are used to deliver and apply an electric field across the small droplet PDLC material 95 as required.

The inner surface 98 of the substrate 94 is a structured surface with a roughened, uneven or otherwise non-flat surface profile. The structured surface may be formed using any appropriate means, including, by way of example, forming with mechanical, embossing, reproduction or optical means. (Hereinafter the substrate with the structured surface will be called the structured substrate 94 and the other substrate will be called the flat substrate 92.) In this embodiment the surface is embossed.

The small droplet PDLC material 95 has a different effective refractive index depending on whether an electric field is applied across it or not. When no electric field is applied, the refractive index of the small droplet PDLC material 95 is different to that of the structured substrate 94, hence scattering and diffusion takes place due to the refractive index mismatch at the roughened surface, as will be described in more detail below.

However, when an electric field is applied across the small droplet PDLC material 95, the refractive index of the small droplet PDLC material 95 becomes approximately or substantially equal to that of the structured substrate 94, hence there is no refractive index mismatch at the roughened surface, hence scattering and diffusion does not take place. Note that the small droplet PDLC material 95 used here does not provide any substantial bulk diffusion effect on light rays as they pass through the material, either when the electric field is applied across the material or when there is no field applied across the material (this is in contrast to the prior art bulk diffusion effect employed by the standard PDLC material in the above mentioned US-A1-2003/0011884).

The small droplet PDLC material 95 has bubble sizes of the order, or less, of the wavelength of visible light. This type of material has been used in so called holographic PDLC, and is described in J H M Neijzen, H M J Boots, F A M A Paulissen, M B van der Mark and H J Cornelissen, Liquid Crystals vol. 22 pp 255-264 (1997); and also Natlab technical note TN021/96, the contents of both these publications being incorporated herein by reference.

Due to the bubble-to-bubble random orientation of the liquid crystal molecules, the cell represents a medium with effective refractive index:

$$n_1 = \frac{2}{3}n_o + \frac{1}{3}n_e$$

When a sufficiently strong electric field is applied across the layer of small droplet PDLC material 95, the liquid crystal molecules in the bubbles will align with the direction of the electric field. For light travelling perpendicularly through the layer (i.e. parallel to the electric field), the layer of small droplet PDLC material 95 will now represent an effective refractive index of:

$$n_2 = n_o$$

Typical values of $n_e$ and $n_o$ are 1.807 and 1.527 respectively, giving, from the above formulae, values $n_1$=1.620 and $n_2$=1.527.

Figure 6:
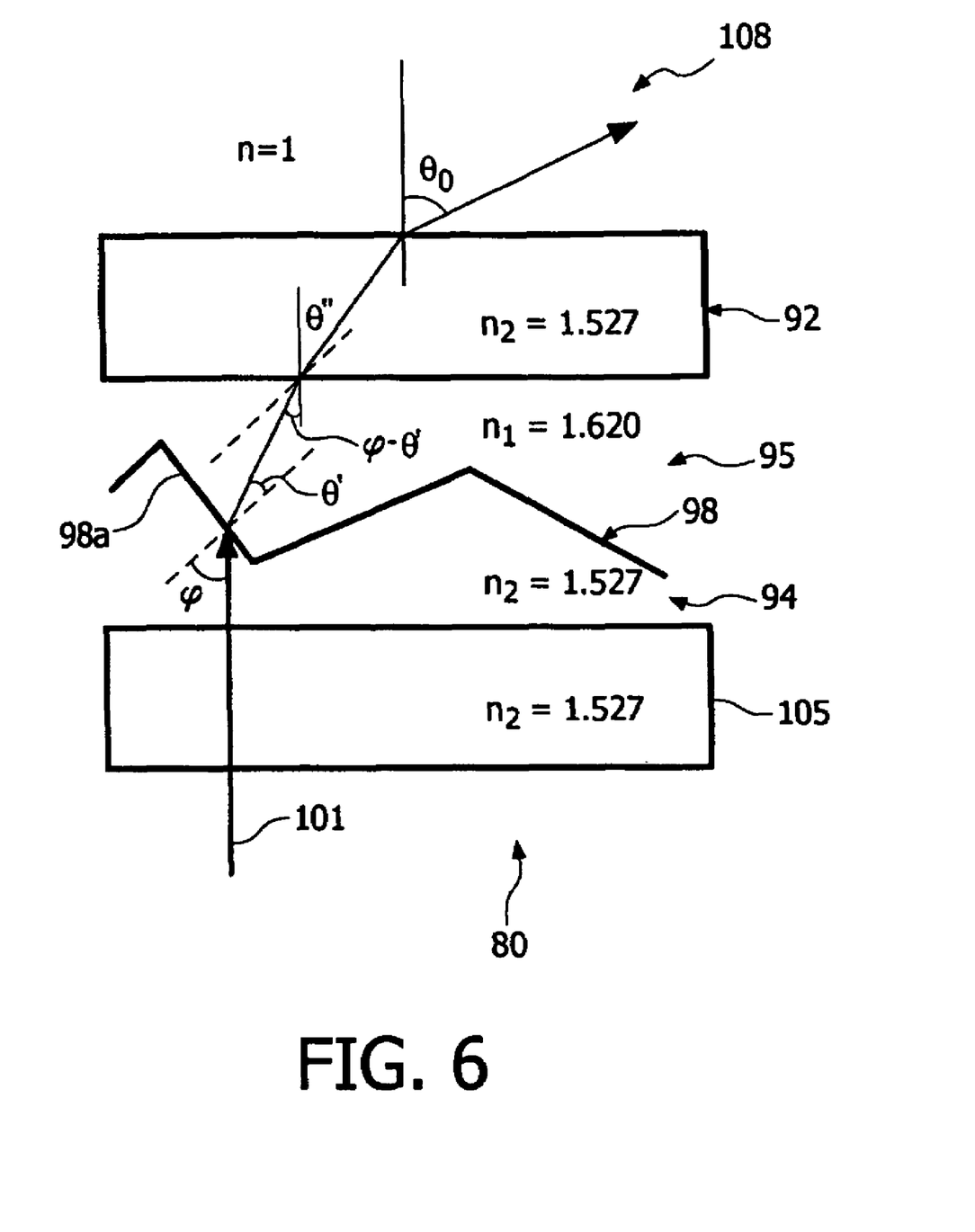
FIG. 6 schematically illustrates the path of a ray of light impinging perpendicularly on the electrically switchable light diffuser of FIG. 5.

FIG. 6 schematically illustrates the path of a ray of light 101 impinging perpendicularly on the electrically switchable light diffuser 80, when no electric field is applied between the transparent electrodes 96, 97 and hence the effective refractive index of the PDLC material 95 is $n_1 = 1.620$.

The ray 101 passes in to the structured substrate 94 from the outer layer of the autostereoscopic display 10, which in this example is a glass substrate 105 which has a refractive index close to $n_2$.

The structured substrate 94 also has refractive index equal to $n_2$. A first refraction takes place at the structured surface 98, which is inclined under an angle φ, and where the refractive index changes from $n_2$ and $n_1$. A second refraction occurs at the interface between the flat substrate 92 and the air 108. (Note that the refractive index of the flat substrate 92 is immaterial, the resulting angle $\theta_o$ being fully determined by the transition from $n_1$ to air. Likewise there is no net effect arising from the presence of the transparent electrode 97, which is not shown in FIG. 6 but is in fact between the second substrate 94 and the small droplet PDLC layer 95, as its refractive operations cancel themselves out, i.e. an effective optical interface is provided at the structured surface 98 between the structured substrate 94 and the small droplet PDLC layer 95 despite the presence therebetween of the transparent electrode 97.

The angle in the air 108 is therefore given by $\theta_o$ in the equation $$\theta_o \cong \sin^{-1}\left\{n_1 \sin\left[\varphi - \left(\sin^{-1}\frac{n_2}{n_1}\sin\varphi\right)\right]\right\}.$$

Let us now consider the angle of a representative portion 98a of the roughened surface 98. This may conveniently be called the facet angle of the representative portion, and is labelled φ in FIG. 6. Over the structured surface 98 as a whole a distribution of such facet angles exists, each facet angle refracting an incident ray in a different angle $\theta_o$, and a distribution of exit angles results. In other words the interface acts overall as a diffuser.

The distribution or variation of facet angle is made such that this varies on a scale larger than the diffraction limit, but smaller than the sub-pixel spacing, hence the effect observed is one of a diffuser with respect to the spacing of the sub-pixels.

In the on-state, when an electric field is applied, the effective refractive index of the PDLC is equal to $n_2$ and no refraction takes place; the cell presents a clear, non-scattering surface, i.e. non-diffusing condition.

The equation above can be used to relate the width of the distribution of angles of the facets of the roughed substrate surface with the width of the diffusion profile, i.e.

$$\sigma_\theta \cong \sin^{-1}\left\{n_1 \sin\left[\sigma_\varphi - \left(\sin^{-1}\frac{n_2}{n_1}\sin\sigma_\varphi\right)\right]\right\}$$

In this example, by taking $\sigma_\varphi = 44°$, we calculate $\sigma_\theta = 5°$. It can be seen that because $n_1$ and $n_2$ are quite close, and closer still if a weaker electric field is applied, $\bar{\theta}$ can be made as small as required. In other embodiments, this can be useful to create an intermediate 2D/3D effect on the display, i.e. an effect where there is still some 3D, with reduced depth, but with enhanced resolution.

In this embodiment, the structured surface is embossed with a surface profile comprising a large number of small discrete areas. Each area is smaller than the lenses (e.g. less than 200 μm) and larger than the wavelength of light (e.g. 1 μm or larger). In this embodiment a convenient number, say one hundred, of different facet angles are used. Each area is made with one of the facet angles, e.g. there may be ten thousand areas with the first facet angle, ten thousand with the second facet angle, and so on. All the areas are mixed over the surface such that in any localised area there is preferably a distribution of at least most of the hundred different facet angles. The areas can be made mechanically (i.e. a rough polish) or photolithographically (employing a semi random fixed design)

Furthermore, in different embodiments, the extent to which the idealised scattering profile of FIG. 4B may be approached is increased by structuring the structured surface of the substrate such that $\bar{\varphi}$ is different in horizontal and vertical directions. In terms of this embodiment, this may be achieved by controlling the distribution of the different discrete areas in the embossing arrangement.

One general advantage is that the change in refractive index from $n_1$ to $n_2$ need only be small.

Another benefit is that the cell structure is very simple and thin plastic substrate materials can be used, as careful alignment is not required.

Another benefit is that the 2D (scattering) state does not require power consumption.

In the above embodiments, the transparent electrodes extend over substantially the whole areas of the substrates 92, 94, thereby switching the whole display area between 2D and 3D mode. However, in other embodiments, the transparent electrodes 96, 97 may be patterned to provide 3D windows in a 2D display or 2D windows in a 3D display. This may be implemented in the manner described in the aforementioned US-A1-2003/0011884.

Although it is preferable that the electrically switchable light diffuser 80 is positioned in front of the directing means 15, as in the above embodiments, it is envisaged that it can be positioned between the directing means and the display panel 11 such that it mates closely with the input side of the directing means instead.

In the above embodiments, the curved surface of the lenticular elements faces the viewer. This usually provides the best optical characteristics. However, in other embodiments, for other reasons, such as ease of manufacture or assembly, the curved surface of the lenticular lens may face away from the viewer.

In the above embodiments, the display is a colour display with sub-pixels of different colour. However, in other embodiments the electrically switchable light diffuser may be used with black and white display means.

Furthermore, although electrically switchable light diffusers as described in the above embodiments are particularly suited for use with the above described display means, nevertheless in other embodiments the electrically switchable light diffusers may be used with any other type of display device or arrangement requiring or potentially making use of an electrically switchable diffuser. Indeed, the present invention extends to electrically switchable diffusers in any other appropriate optical application, and in this sense the details in the above embodiments relating to the electrically switchable diffuser as such are to be considered as representing embodiments of stand-alone electrically switchable diffusers according to aspects of the present invention.

In the above embodiments, the surface profile of the structured surface is formed by embossing. However, in other embodiments, the surface profile of the structured surface may be formed using any appropriate means, including, by way of example, forming with mechanical, reproduction, chemical etching, optical means, and so on.

In the above embodiments, the surface profile of the structured surface comprises approximately ten thousand individual areas sharing between them, in a spatially distributed fashion, ten different facet angles. As a result, when refraction occurs at the interface defined by the structured surface a spatially mixed distribution of, in this example, ten different output angels occurs. The surface is substantially flat within each area itself, albeit at the facet angle it is characterised by. However, in other embodiments, the structured surface may be of any other suitable form.

For example, in variations of the above embodiments, the number of areas and/or the number of different facet angles employed may be different.

In any of the above, one possibility is for the areas to be approximately of similar area to each other, whereas another possibility is for some or all of the areas to be of different area.

In any of the above, one possibility is there may be approximately equal numbers of areas of each facet angle, whereas another possibility is for there to be different numbers of areas of some or all of the different facet angles.

In the above embodiments, the structured surface is embossed using an embossing tool/stamp with the above described profile details formed by detailed design, using e.g. a computer aided (CAD) process. However, in other embodiments, the surface profile may be formed with random or pseudo-random surface profile details. For example, this may occur if a (rough) polishing or etching process is used. Another possibility is that a pseudo-random surface may be produced by means of an automated design process involving e.g. computer algorithms designed to provide a suitable mixed distribution of facet angles and characteristics.

Another possibility is that the structured surface comprises, either totally or in part, areas of surface that are curved, with different angles of curvature to each other or that are nevertheless offset, in a predetermined or pseudo-random or random fashion, such that a mixture of refraction angles occur.

Clearly, there are many ways, too numerous to mention here, in which the exact form of the structured surface may be implemented. It is to be appreciated, therefore, that the above examples and possibilities are merely illustrative, and that the invention nevertheless encompasses any structured surface profile that provides plural output refraction angles such that an extent of effective scattering or diffusion takes place.

In the above embodiments, small droplet PDLC is used as an electro-optic material or medium that changes its refractive index under application of an electric field. However, in other embodiments, other materials or means may be used as an electro-optic material or medium that changes its refractive index under application of an electric field, preferably changing refractive index by a small amount. For example, a conventional liquid crystal material (LC) may be used, e.g. in supertwisted nematic form. An advantage of PDLC is that in the absence of an electric field, the material will relax quicker, and with a finer morphology to the effective refractive index $n_r$. An advantage of using a conventional LC is that the LC layer can be oriented in a favourable direction, namely in the direction of a polariser of the liquid crystal display. In the scattering state for $n_1$ the full value $n_e$ can be obtained, whereas in the small droplet PDLC case the highest possible value is given by the equation above.

In the non-scattering state, both PDLC and LC can be arranged to have index $n_2=n_o$.

Another possibility for use as an electro-optic material or medium that changes its refractive index under application of an electric field is to use a so-called "electro-wetting" arrangement. In an "electro-wetting" arrangement the wetting behaviour of a fluid on a surface is manipulated by electrically changing the fluid-surface contact angle. In such an embodiment an oil film that matches the index of the structured surface with n=1.5 can be fully replaced by a water film having n=1.33 (i.e. the liquids are physically moved by virtue of the effect of the electric field on them). The latter (water) state will result in scattering, hence the 2D mode, the former (oil) state yields a non-scattering surface, hence the 3D mode.

In the above embodiments the scattering/diffusion effect takes place when there is no electric field applied, and the electrically switchable diffuser is rendered substantially non-diffusing when the electric field is applied. In other embodiments this is reversed, by making the refractive index of the electro-optic material match that of the structured substrate when no field is applied.

In the above embodiments, the transparent electrodes are directly either side of the electro-optic material, hence one of the transparent electrodes is provided on the structured surface of the structured substrate so that it is directly against the electro-optic material, i.e. between the structured substrate and the electro-optic material (although it has no overall effect on the refraction output angles, since any refraction at the interface of the substrate and the transparent conductor is cancelled out by any refraction at the interface between the transparent conductor and the electro-optic material). In other embodiments, one or both of the transparent electrodes may be placed for example on the outer surface of the substrates, e.g. on the outer (flat) surface of the structured substrate. In this case when the electric field is applied between the transparent conductors, some of the electric field falls across the substrate or substrates and some across the electro-optic material.

In the above embodiments, one of the refractive index values of the electro-optic material used is that for no electric field. In other embodiments, instead of one condition of operation being provided by no field being applied, both conditions of operation are provided by virtue of respective different magnitudes of electric field being applied. In this case, for example, the refractive index at one electric field magnitude would approximately match that of the structured substrate (i.e. no diffusion), whereas the refractive index at the second electric field magnitude would differ from that of the structured substrate. Although this would mean power would need to be used for both 2D and 3D modes, this would offer the advantage that the requirement for the refractive index of the electro-optic material to match that of the structured substrate would be relaxed, allowing a wider choice of materials and increased manufacturing tolerances.

In the above embodiments a non-electro-optic medium is provided with a structured surface, and positioned adjacent an electro-optic material (i.e. a medium that changes its refractive index under application of an electric field). However, in other embodiments, if a solid electro-optic material is used, the structured surface may be provided on the electro-optic material.

In the above embodiments, a lenticular sheet comprising lenticular elements is used as a light directing means. However, in other embodiments, any other appropriate directing means may be used. For example, a sheet comprising separate spherical lenses for each pair or other grouping of sub-pixels may be used.

The invention claimed is:

1. An electrically controllable light diffuser comprising:
an optical medium and an electro-optic medium arranged with an effective optical interface between a first surface of the optical medium and a first surface of the electro-optic medium; and
transparent electrodes arranged for providing an electric field across the electro-optic medium so as to allow control of the refractive index of the electro-optic medium by application or non-application of an electric field across the electro-optic medium, wherein
one of the first surface of the optical medium and the first surface of the electro-optic medium is structured with a surface profile, the surface profile comprising plural surface angles, wherein the plural surface angles comprise a distribution of facet angles which vary on a scale larger than a diffraction limit, but smaller than a sub-pixel spacing, the distribution configured to provide an effect observed as one of a diffuser with respect to the spacing of sub-pixels, wherein the effective optical interface acts overall as the diffuser, further having an angular diffusion profile with a vertical scattering component of less than one percent (1%) and a horizontal scattering component of approximately ten percent (10%), such that (i) when the refractive index of the electro-optic medium is controlled by application or non-application of an electric field to be substantially equal to the refractive index of the optical medium there is substantially no refraction arising from the effective optical interface between the first surface of the optical medium and the first surface of the electro-optic medium, and such that (ii) when the refractive index of the electro-optic medium is controlled by application or non-application of an electric field to be different from the refractive index of the optical medium refraction does take place at the effective optical interface between the first surface of the optical medium and the first surface of the electro-optic medium and, by virtue of there being plural surface angles, the refraction directs light to a corresponding plurality of angles thereby providing a diffusion effect.

2. A diffuser according to claim 1, wherein the plural surface angles are distributed differently in different surface directions such that light is diffused to different extents in different surface directions.

3. A diffuser according to claim 1, wherein the refractive index of the electro-optic medium is substantially equal to the refractive index of the optical medium when an electric field is applied across the electro-optic medium and the refractive index of the electro-optic medium is different from the refractive index of the optical medium when no electric field is applied across the electro-optic medium.

4. A diffuser according to claim 1, wherein the electro-optic medium comprises small droplet polymer dispersed liquid crystal.

5. An autostereoscopic display device, comprising:
an array of sub-pixels or pixels;
directing means comprising a plurality of directing elements;
groups of the sub-pixels or pixels, each group comprising plural sub-pixels or pixels, being arranged in correspondence with respective directing elements; and
an electrically controllable diffuser, the electrically controllable diffuser comprising:
an optical medium and an electro-optic medium arranged with an effective optical interface between a first surface of the optical medium and a first surface of the electro-optic medium; and
transparent electrodes arranged for providing an electric field across the electro-optic medium so as to allow control of the refractive index of the electro-optic medium by application or non-application of an electric field across the electro-optic medium, wherein
one of the first surface of the optical medium and the first surface of the electro-optic medium is structured with a surface profile, the surface profile comprising plural surface angles, wherein the plural surface angles comprise a distribution of facet angles which vary on a scale larger than a diffraction limit, but smaller than a sub-pixel spacing, the distribution configured to provide an effect observed as one of a diffuser with respect to the spacing of sub-pixels, wherein the effective optical interface acts overall as the diffuser, further having an angular diffusion profile with a vertical scattering component of less than one percent (1%) and a horizontal scattering component of approximately ten percent (10%), such that (i) when the refractive index of the electro-optic medium is controlled by application or non-application of an electric field to be substantially equal to the refractive index of the optical medium there is substantially no refraction arising from the effective optical interface between the first surface of the optical medium and the first surface of the electro-optic medium, thereby providing a non-diffusing mode, and such that (ii) when the refractive index of the electro-optic medium is controlled by application or non-application of an electric field to be different from the refractive index of the optical medium refraction does take place at the effective optical interface between the first surface of the optical medium and the first surface of the electro-optic medium and, by virtue of there being plural surface angles, the refraction directs light to a corresponding plurality of angles thereby providing a diffusion mode;
the sub-pixels or pixels, the directing means; and the electrically controllable diffuser being arranged such that:
when the diffuser is in the non-diffusing mode, light from different sub-pixels or pixels within a group is directed in different directions by the corresponding directing element, thereby providing a 3D mode; and
when the diffuser is in the diffusing mode, light from different sub-pixels or pixels within a group is mixed.

6. A display device according to claim 5, wherein in the diffusing mode the extent of diffusion is sufficient to provide sufficient mixing to provide a substantially 2D image.

7. A display device according to claim 5, wherein in the diffusing mode the extent of diffusion is only sufficient to provide sufficient mixing to provide an image intermediate between 2D and 3D.

8. A display device according to claim 5, wherein the directing means is a lenticular sheet and the directing elements are lenticular elements.

9. A display device according to claim 8, wherein the sub-pixels or pixels are arrayed in rows and columns; the lenticular elements are arranged substantially parallel with the columns, such that groups of the sub-pixels or pixels along a row are arranged in correspondence with respective lenticular elements; and the plural surface angles are distributed differently in the row and column directions such that in the diffusing mode light is diffused more in the row direction than in the column direction.

10. A display device according to claim 5, wherein the refractive index of the electro-optic medium is substantially equal to the refractive index of the optical medium when an electric field is applied across the electro-optic medium and the refractive index of the electro-optic medium is different from the refractive index of the optical medium when no electric field is applied across the electro-optic medium, so that the diffusing mode is achieved when no electric field is applied.

11. A display device according to claim 5, wherein the electro-optic medium comprises small droplet polymer dispersed liquid crystal.

* * * * *